Oct. 24, 1944.     D. C. PRINCE     2,361,237
CURRENT COLLECTOR
Filed Jan. 2, 1943
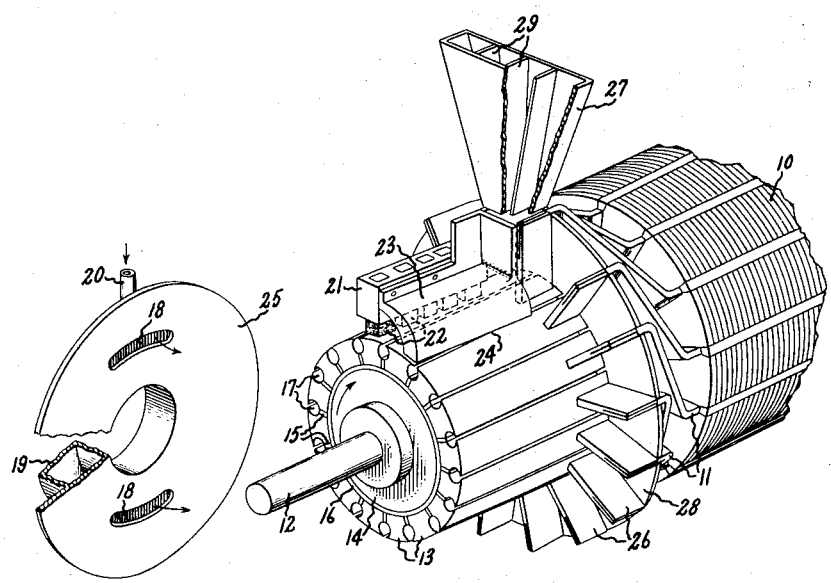
Inventor:
David C. Prince,
by Harry E. Dunham
His Attorney.

Patented Oct. 24, 1944

2,361,237

UNITED STATES PATENT OFFICE 2,361,237

CURRENT COLLECTOR

David C. Prince, Schenectady, N. Y., assignor to General Electric Company, a corporation of New York Application January 2, 1943, Serial No. 471,145

10 Claims. (Cl. 171—321)

My invention relates to current collectors and more particularly to an arrangement for minimizing arcing between commutator segments.

Direct current commutating machines are limited in their design by the number of volts that can be handled per commutator bar. This limitation is not due to the insulation between bars which may be made several times as high as is customary, not is it due to commutating difficulties under normal conditions, since by special commutating poles, compensation, and other means, the steady state conditions can be made suitable for commutation at much higher values of volts per bar. The actual limitation is that if a spark should occur for any cause such as foreign matter on the commutator or a sudden increase in load, the available voltage may maintain such a spark and carry it around the commutator until a flashover occurs between adjacent brush holders.

An object of my invention is to provide a means for positively extinguishing such arcs with a minimum of damage to the commutating surface and with assurance that arcs will not spread across the commutator to produce a flashover.

Another object of my invention is to provide an improved current collector with an arrangement for minimizing arcing between commutator segments.

A further object of my invention is to provide an improved current collector which utilizes an arc extinguishing chute in connection with air pressure for minimizing the effects of arcing between adjacent commutator segments.

Further objects and advantages of my invention will become apparent and my invention will be better understood from the following description referring to the accompanying drawing, and the features of novelty which characterize my invention will be pointed out with particularity in the claims annexed to and forming part of this specification.

The figure in the drawing is a partially exploded perspective view of an embodiment of my invention with sections broken away to show the internal details of some of the parts.

Referring to the drawing, I have shown a dynamo-electric machine rotatable member or armature having a laminated core 10 provided with winding slots in which a winding 11 is arranged. The armature is mounted on a suitable shaft 12 and is provided with a commutator including a plurality of axially extending commutator segments 13 mounted about the shaft 12 and held in position by a suitable clamping ring 14. The commutator segments 13 are insulated from each other by suitable insulating strips 15 and by a cone 16 of insulating material arranged between the segments 13 and the clamping ring 14. The outer radial sides of the commutator segments are formed with grooves arranged adjacent each other in the assembled commutator to provide axially extending air passages 17 between adjacent commutator bars. These air passages are open to the atmosphere between the segments on the outer surface of the commutator and are open at the outer end of the commutator and are adapted to communicate with openings 18 formed in a manifold 19 of insulating material to which air is supplied under pressure from any suitable supply by a conduit 20. Each of the openings 18 in the baffle 19 is arranged to communicate with the ends of the air passages 17 when adjacent a brush holder 21 in which a plurality of current collecting brushes 22 is arranged in contact with the commutator segments. The brush holder 21 and brushes 22 extend axially of the machine and at a slight angle to the commutator segments, thereby providing a trailing end to the commutator segments and commutator slots adjacent the inner end of the commutator to which the armature winding 11 is electrically connected. A shield 23 of insulating material is mounted on the brush holder 21 and is arranged substantially parallel thereto, such that the lower end 24 of the shield forms a slight angle with the commutator segments and the slots between segments to provide a trailing end to the slots adjacent the inner end of the commutator near the armature winding 11. This shield 24 is formed and arranged to cooperate with a flange 25 on the manifold 19 to enclose a space on the trailing side of the brushes in which any commutation spark will occur when the manifold 19 is in position over the shaft 12. The armature winding 11 is connected to the commutator through risers 26 formed on the inner ends of the commutator bars. These risers are formed as projections which extend outwardly towards a multi-partition arc-splitting chute 27 formed of insulating material and having open upper and lower ends. The lower end of the chute 27 extends into close proximity with the outer ends of the risers 26, which form a closure with the end of the chute about the slot between the segments and with an insulating disc 28 through which the leads of the winding 11 pass, and the chute is provided with a plurality of inner partitions or walls 29 extending between the outer walls of the chute to provide a plurality of outwardly extending passages between these partition walls. With this construction, air under pressure is supplied through the conduit 20 to the manifold 19 and the air pressure from the manifold 19 in the axially extending air passage 17 tends to blow out any arcs formed between commutator segments on the trailing side of the brushes, and such arcs are enclosed within the shield 23 and tend to travel from the outer end of the commutator towards the inner trailing end of the commutator segment slots due to the relative angle between the segments and the brushes 22, as the arc tends to travel towards the brushes which are in positions to short circuit adjacent commutator bars passing from under the brushes. Thus, arcs between commutator segments are blown outwardly by the air pressure and travel towards the commutator risers 26, and at this end of the commutator, the arc is blown outwardly towards the arc-splitting chute 27 and is then split into elongated sections between the partitions 29 of the chute, thereby splitting and extinguishing such arcs in the chute. Thus, I have provided an improved arrangement for minimizing the effect of arcing between commutator segments with a positive extinguishing of any arcs which may form so as to prevent flashover, and the passage of air between segments also tends to ventilate and cool the commutator providing for a more efficient operation of the current collector.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A current collector for a dynamo-electric machine including a commutator having a plurality of commutator segments with air passages between adjacent segments open to the atmosphere between said segments, a brush holder extending at a slight angle to said commutator segments, brushes in said brush holder arranged in engagement with said commutator, means for supplying air under pressure to said air passages between said commutator segments adjacent said brush holder for blowing out electric arcs between commutator segments adjacent said brushes, and means including a shield for guiding an arc toward the trailing end of the slot formed by the angle between segments and said brush holder.

2. A current collector for a dynamo-electric machine including a commutator having a plurality of commutator segments with air passages between adjacent segments open to the atmosphere between said segments, a brush holder extending at a slight angle to said commutator segments, brushes in said brush holder arranged in engagement with said commutator, means for supplying air under pressure to said air passages for blowing out electric arcs between commutator segments adjacent said brushes, means for guiding an arc toward the trailing end of a slot between segments between which an arc has been drawn, and means including a multi-partition chute adjacent the inner end of said brush holder and the trailing end of said brushes into which air in said air passages is adapted to blow arcs for splitting and extinguishing such arcs in said chute.

3. A current collector for a dynamo-electric machine including a commutator having a plurality of commutator segments with air passages between adjacent segments open to the atmosphere between said segments, a brush holder extending at a slight angle to said commutator segments, brushes in said brush holder arranged in engagement with said commutator, means for supplying air under pressure to said air passages when adjacent said brushes for blowing out electric arcs between commutator segments on the trailing sides of said brushes, means including a shield for guiding an arc toward the trailing end of the slot between segments between which the arc has been drawn, and means including an arc-splitting chute adjacent the inner end of said brush holder and the trailing end of slots into which the air in said air passages is adapted to blow arcs for splitting and extinguishing such arcs in said chute.

4. A current collector for a dynamo-electric machine including a commutator having a plurality of axially extending commutator segments formed and arranged to provide air passages between adjacent segments open to the atmosphere between said segments and open at the outer end of said commutator, a brush holder extending at a slight angle to said commutator segments, brushes in said brush holder arranged in engagement with said commutator, means for supplying air under pressure to said air passages when adjacent said brushes for blowing out electric arcs between commutator segments on the trailing sides of said brushes, and means including a shield adjacent the trailing side of said brushes arranged substantially parallel to said brush holder and at a slight angle to said commutator segments for guiding an arc toward the trailing end of a slot in which an arc has been drawn.

5. A current collector for a dynamo-electric machine including a commutator having a plurality of commutator segments formed and arranged to provide air passages between adjacent segments open to the atmosphere between said segments and open at the outer end of said commutator, a brush holder extending at a slight angle to said commutator segments, brushes in said brush holder arranged in engagement with said commutator, means including a manifold for supplying air under pressure to the outer ends of said air passages when adjacent said brushes for blowing out electric arcs between commutator segments on the trailing sides of said brushes, means including a shield for guiding an arc toward the trailing end of a slot in which an arc has been drawn, and means including an arc-splitting chute adjacent the inner end of said brush holder into which air in said air passages is adapted to blow arcs for splitting and extinguishing such arcs in said chute.

6. A current collector for a dynamo-electric machine including a commutator having a plurality of axially extending commutator segments formed and arranged to provide air passages between adjacent segments open to the atmosphere between said segments and open at the outer end of said commutator, a brush holder extending at a slight angle to said commutator segments, brushes in said brush holder arranged in engagement with said commutator, means including a manifold for supplying air under pressure to the outer ends of said air passages when adjacent said brushes for blowing out electric arcs between commutator segments on the trailing sides of said brushes, and means including a shield adjacent the trailing side of said brushes arranged substantially parallel to said brush holder and at a slight angle to said commutator segments for guiding an arc toward the trailing end of a slot in which an arc has been drawn.

7. A current collector for a dynamo-electric machine including a commutator having a plurality of commutator segments formed and arranged to provide air passages between adjacent segments open to the atmosphere between said segments and open at the outer end of said commutator, a brush holder extending at a slight angle to said commutator segments, brushes in said brush holder arranged in engagement with said commutator, means for supplying air under pressure to said air passages when adjacent said brushes for blowing out electric arcs between commutator segments on the trailing sides of said brushes, means including a shield mounted on the trailing side of said brush holder arranged substantially parallel to said brush holder and at a slight angle to said commutator segments for guiding an arc toward the trailing end of a slot in which an arc has been drawn, and means including an arc-splitting chute adjacent the inner end of said brush holder into which air in said air passages is adapted to blow arcs for splitting and extinguishing such arcs in said chute.

8. A current collector for a dynamo-electric machine including a commutator having a plurality of commutator segments formed and arranged to provide air passages between adjacent segments and open between said segments and at the outer end of said commutator, a brush holder extending at a slight angle to said commutator segments, brushes in said brush holder arranged in engagement with said commutator, means including a manifold for supplying air under pressure to the outer ends of said air passages when adjacent said brushes for blowing out electric arcs between commutator segments on the trailing sides of said brushes, means including a shield adjacent the trailing side of said brushes arranged substantially parallel to said brush holder and at a slight angle to said commutator segments for guiding an arc toward the trailing end of a slot in which an arc has been drawn, and means including a multi-partition arc-splitting chute adjacent the inner end of said brush holder and the trailing end of the slots into which air in said air passages is adapted to blow arcs for splitting and extinguishing such arcs in said chute.

9. A current collector for a dynamo-electric machine including a commutator having a plurality of axially extending commutator segments spaced apart and arranged to provide axially extending air passages between said segments open to the atmosphere between said segments and open at the outer end of said commutator, means for insulating said segments from each other, a brush holder extending axially and at a slight angle to said commutator segments, brushes in said brush holder arranged in engagement with said commutator, means including a manifold for supplying air under pressure to the outer ends of said air passages when adjacent said brushes for blowing out electric arcs between commutator segments on the trailing side of said brushes, means including a shield of insulating material mounted on the trailing brush side of said brush holder arranged substantially parallel to said brush holder and said brushes and at a slight angle to said commutator segments for guiding an arc toward the trailing end of the slots in which an arc has been drawn, and means including a multi-partition arc-splitting chute adjacent the inner end of said brush holder and the trailing end of said slots into which the air in said air passages is adapted to blow arcs for splitting and extinguishing such arcs in said chute.

10. A current collector for a dynamo-electric machine including a commutator having a plurality of commutator segments with air passages between adjacent segments open to the atmosphere between segments and open at the outer end of said commutator, means for insulating said segments from each other, a brush holder extending at a slight angle to said commutator segments, brushes in said brush holder arranged in engagement with said commutator, means including a manifold for supplying air under pressure to the outer ends of said air passages when adjacent said brushes for blowing out electric arcs between commutator segments adjacent said brushes, means including a shield of insulating material mounted on the trailing side of said brushes arranged substantially parallel to said brush holder and said brushes and at a slight angle to said commutator segments for guiding an arc toward the trailing end of a slot in which an arc has been drawn, means including a multi-partition arc-splitting chute of insulating material adjacent the inner end of said brush holder and the trailing end of the slots into which the air in said air passages is adapted to blow arcs for splitting and extinguishing such arcs in said chute, and means including outwardly extending projections on the ends of said commutator segments adjacent said chute arranged to form a closure with the adjacent end of said chute about a slot between segments for guiding an arc outwardly into said chute.

DAVID C. PRINCE.